May 4, 1965

LE ROY J. LEISHMAN 3,182,196

INTERLOCKING MEANS FOR X-RAY SPOT FILM
DEVICE CASSETTE CARRIAGES
Filed Aug. 15, 1962

INVENTOR:
Le Roy J. Leishman 3,182,196
INTERLOCKING MEANS FOR X-RAY SPOT FILM DEVICE CASSETTE CARRIAGES
Le Roy J. Leishman, 9232 3rd Ave., Los Angeles, Calif.
Filed Aug. 15, 1962, Ser. No. 217,031
1 Claim. (Cl. 250—66)

The invention herein described pertains primarily to X-ray spot film devices and more particularly to devices of this type in which the cassette carriage is brought into the X-ray field by a spring or power-driven means upon the operation of a manual control.

My invention is especially applicable to spot film devices such as those described in my Patents Nos. 2,817,766 and 2,811,648.

In all automatic spot film devices, means are provided whereby a cassette containing an unexposed film may be moved to any of a series of different positions at least partly within the X-ray beam upon actuation of a button or manual lever, the position to which the cassette will move being dependent upon the angular orientation of a control shaft. This control shaft is associated with levers, tracks, or other instrumentalities that not only determine the path over which the cassette will move to its particular destination within, or partially within, the X-ray beam, but also determine what this specific stopping position is to be. These specific positions may be called exposure positions. If these levers, tracks or other instrumentalities are not correctly disposed for directing and guiding the cassette to its pre-selected destination, it is sometimes possible for the apparatus to jam or otherwise to misfunction.

Most spot devices of the general type hereinbefore mentioned are provided with a detent wheel at least operatively connected for positive rotation with the aforementioned control shaft. When the control shaft is properly detented, the various levers, tracks or other instrumentalities that determine the path and destination of the cassette, will be properly positioned so that no damage can occur when the cassette is released for its journey into the X-ray field, but if the control shaft is not properly detented, damage may result. The primary object of the invention is to make it impossible to release the carriage unless the control shaft is properly detented.

Another object is to provide apparatus for this purpose that is simple and durable and extremely unlikely to get out of order.

Another object is to provide equipment for the aforementioned purposes that is inexpensive to build and that will therefore keep down the ultimate price of the spot film device.

Still other objects will appear as the specification proceeds.

Figure 3:
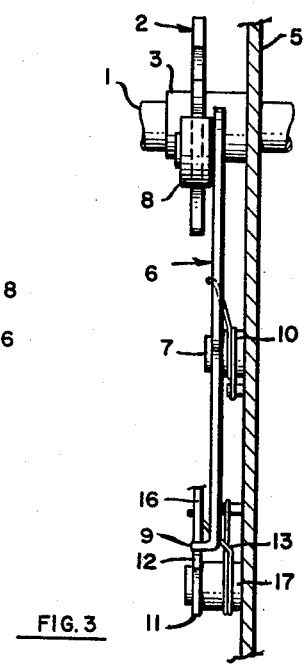
FIG. 3 is a view taken on line 3—3 of FIG. 1.

In each of the aforementioned figures, the shaft 1 is the control shaft of the spot film device which determines, when accurately indexed or detented, the ultimate exposure position to which the aforementioned cassette carriage will move. Such a carriage is shown in the various patents previously mentioned, but it is not shown in the drawings of the instant application for the reason that it forms no part per se of the present invention. In the embodiment of my invention shown in the drawings and described herein, the detent wheel 2 is provided with a hub 3 by means of which it is mounted on the shaft 1. Inasmuch as the detent wheel 2 must move positively with the shaft 1, it must be keyed in a suitable manner to the shaft, as by means of the pin 4 passing through the collar 3 and through the shaft 1. This shaft may be journaled in a plate 5, as indicated in FIG. 3.

In order accurately to index or detent the wheel 2, I provide a rockable structure 6 mounted on a boss or stub shaft for limited rotation in either direction on an axis that is parallel to the shaft 1. The angularly movable structure 6 includes a part 8 that is so radially spaced with respect to the axis of the structure 6 that it will nest within any of the notches provided between adjacent points of the detent or star-wheel 2. In the instant embodiment, the part 8 is a roller or ball bearing, although the detent wheel may of course be indexed by a solid projection formed integrally with the angularly movable structure itself. In the form that I presently prefer, the rockable structure comprises a lever 6 pivoted intermediate its ends, the end on the side of the lever opposite from the end where the ball bearing 8 is positioned being provided with a lug or lip 9 that protrudes perpendicularly from the general plane of the lever or rocker itself.

The lever 6 is biased by any suitable means, such as by the torsion spring 10, so that the nestable component 8 will be held yieldingly in a definite angular position by the pressure of member 8 on the sides of the grooves or depressions between the adjoining points of the detent wheel.

Another tiltable rocker structure is mounted for pivotal movement on a second axis that is parallel to the pivoting axis of the structure 6 and also to the axis of rotation of the control shaft 1. The mounting for structure 11 is provided by a sleeve or stub shaft 17 suitably positioned on plate 5. In the embodiment that I presently prefer, the structure 11 is a flat lever and comprises an abutment 12 radially spaced from the axis of the lever, the abutment 12 in one suitable form being a radially extending projection or finger of the lever having a radially extending edge. A keeper spring 13 urges lever 11 to an angular position that is determined by the stopping pin 14 anchored in plate 5, the spring 13 holding structure 11 against the pin. Member 11 is angularly movable from the angular position shown in FIGS. 1 and 2 to a second angular position in which the projection or abutment 12 will be disposed as indicated in broken lines 15 in FIG. 2.

Rocker 11 is so operatively associated with the means for releasing the carriage for movement into the X-ray field that this rocker will move from the illustrated first position to the aforementioned second angular position during the releasing action which unlatches the carriage from its home position, this home position being shown in the aforementioned patents. The arm 12 of structure 11 will move from its first position shown in full lines to the second position shown in broken lines at 15 as the carriage is being released.

Figure 1:
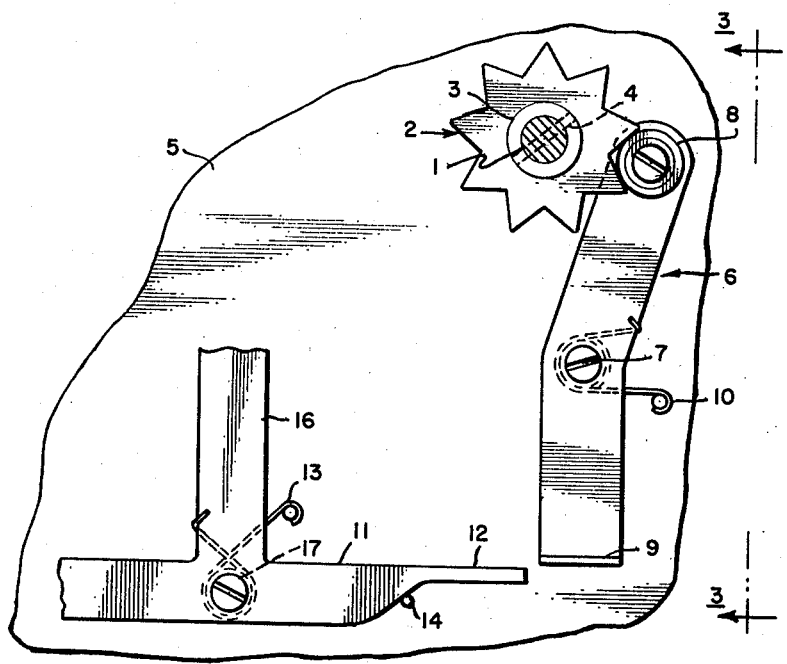
FIG. 1 is a view of the principal components of one embodiment of my invention showing the detent interlocking means, the view being taken in a direction that is parallel to the control shaft and to the axis of two of the angularly movable components, showing a detent wheel in a properly detented position.
Figure 2:
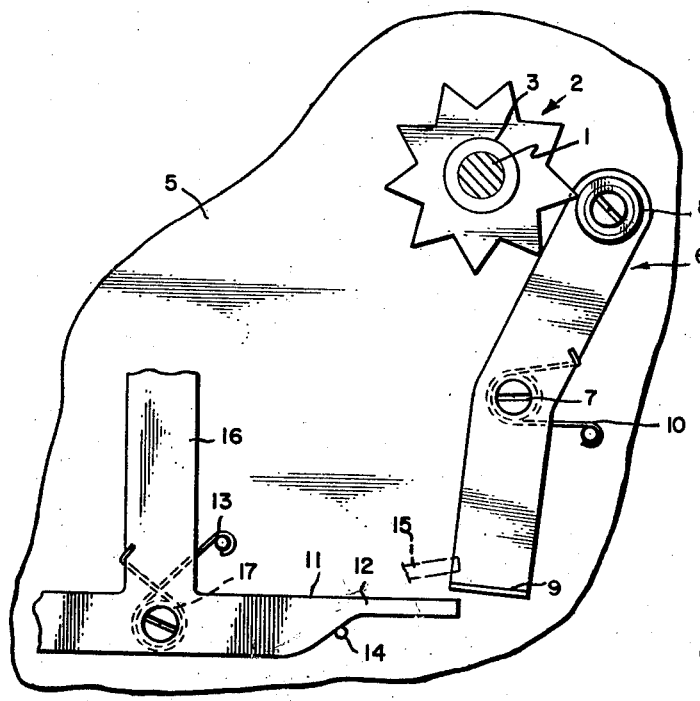
FIG. 2 shows the same components pictured in FIG. 1, but with the detent wheel not properly indexed.

When the indexed wheel 2 is properly positioned as indicated in FIG. 1, the part or lug 9 on the lower end of the rocking structure 6 will be positioned outside the path of movement of the end 12 of the rocker 11 as end 12 moves from its aforementioned first rest position to its aforementioned second position while the cassette carriage is being unlatched for movement into the field; however, if the detent wheel 2 is not properly indexed, as shown in FIG. 2, the lip or lug 9 will be disposed within the path of the abutment 12 on lever 11, with the result that the latter structure will not be able to move from its first position to its aforementioned second position. The lug 9 will intercept the path of movement of the abutment 12. As a consequence, the carriage cannot be released.

In spot film devices of the types hereinbefore mentioned, a predetermined sequence of exposure positions to be occupied by the cassette within or partially within the X-ray field may be set up merely by turning the control shaft to an initial angular position which is specific or individual to a given sequence or series. As the cassette carriage returns to its home or rest position after occupying one of these sequential exposure positions, the control shaft 1 must be rotated to an angular position that is specific to the cassette's next exposure position. This rotation may be effected automatically by mechanism such as that shown in one of the aforementioned patents, not shown here because it forms no part of the invention per se, or the shaft may be turned manually as is done for setting it for the first exposure in any series. Whenever the shaft rotates for either of these purposes, the various points on the index or detent wheel must push the detenting member 8 aside, as indicated in FIG. 2. As this action takes place, the lug 9 moves back and forth between the two positions shown in FIGS. 1 and 2, the abutment 12 offering no opposition to, or interference with, such movement.

Occasions arise when an entire series of exposures must be taken in quick succession. This is accomplished merely by maintaining the releasing means in its releasing position. In such cases, the cassette carriage is not stopped in its home or rest position after each excursion into the field, but immediately returns to the field for the next exposure of the series. During such a series of exposures, the rockable structure 11 remains in the angular position indicated by broken lines at 15, for, as hereinbefore explained, the rocker moves to this angular position in response to the actuation of the releasing means. This requires that the abutment or end 12 be sufficiently narrow to permit the member or lug 9 to move beneath abutment 12 each time that the indexed wheel moves from one detented position to the next.

It will readily be understood by those skilled in the art that various modifications may be made from the specific structure and arrangement hereinbefore described and shown in the drawings, and that various substitutions of elements may be made providing the substituted elements perform the same functions as those replaced. Moreover, parts may be transposed, differently shaped and differently positioned—all without departing from the broad spirit of my invention as succinctly set forth in the appended claim.

My claim is:

In an X-ray spot film device, means for preventing the release of the cassette carriage into the X-ray field unless the control shaft is accurately indexed, said means comprising: a control shaft; a detent wheel having a plurality of peripheral points, said detent wheel rigidly mounted on said shaft; a first structure pivoted on a first axis parallel to said shaft and comprising a relatively narrow finger extending substantially radially with respect to said first axis, said first structure with its finger movable from a first angular position to a second angular position as the carriage is being released; means for yieldingly holding said first structure in said first angular position; a second structure pivoted on a second axis parallel to said shaft, said second structure comprising (a) a component so positioned and shaped that in one angular position of said second structure it will nest between two of said peripheral points for indexing and detenting said detent wheel, and (b) a part so located on said second structure on the opposite side of said second axis from said component that when said component is nesting between two of said peripheral points said part will lie outside the path of angular movement of said finger and so that as said component moves away from between said points, said part will move in a direction substantially parallel to said finger along one side thereof into the path of angular movement of said finger, thus preventing said first structure from being moved from said first angular position to said second angular position, or vice versa; and a spring for urging said second structure to said one angular position; said finger and said part so shaped with respect to each other that when said first structure is in said first angular position said part may move along one side of said finger and so that when said first structure is in said second angular position said part may move along the opposite side of said finger.

References Cited by the Examiner
UNITED STATES PATENTS

| | | | |
|---|---|---|---|
| 2,811,648 | 10/57 | Leishman et al. | 250—66 |
| 2,819,407 | 1/58 | Haupt | 250—66 |
| 2,939,957 | 6/60 | Yerkovich | 250—66 |

RALPH G. NILSON, *Primary Examiner.*